(12) United States Patent
Henkin et al.

(10) Patent No.: US 10,719,836 B2
(45) Date of Patent: Jul. 21, 2020

(54) METHODS AND SYSTEMS FOR ENHANCING WEB CONTENT BASED ON A WEB SEARCH QUERY

(75) Inventors: Assaf Henkin, Tel Aviv (IL); Itai Brickner, Tel Aviv (IL); Stanislav Krichevsky, Petah Tiqwa (IL)

(73) Assignee: Amobee, Inc., San Diego, CA (US)

( * ) Notice: Subject to any disclaimer, the term of this patent is extended or adjusted under 35 U.S.C. 154(b) by 426 days.

(21) Appl. No.: 13/234,679

(22) Filed: Sep. 16, 2011

(65) Prior Publication Data

US 2013/0073382 A1    Mar. 21, 2013

(51) Int. Cl.
*G06Q 30/02* (2012.01)
*G06F 16/951* (2019.01)
*G06F 16/955* (2019.01)
*G06F 16/958* (2019.01)

(52) U.S. Cl.
CPC .......... *G06Q 30/02* (2013.01); *G06F 16/951* (2019.01); *G06F 16/955* (2019.01); *G06F 16/972* (2019.01)

(58) Field of Classification Search
CPC .................................................... G06Q 30/00

USPC .......... 705/14.43; 707/649, 791, 708; 703/3
See application file for complete search history.

(56) References Cited

U.S. PATENT DOCUMENTS

| | | | | |
|---|---|---|---|---|
| 7,451,099 | B2* | 11/2008 | Henkin | G06Q 30/02 703/3 |
| 7,603,349 | B1* | 10/2009 | Kraft et al. | |
| 8,131,767 | B2* | 3/2012 | Brindley | 707/791 |
| 2007/0174255 | A1* | 7/2007 | Sravanapudi et al. | 707/3 |
| 2007/0192181 | A1* | 8/2007 | Asdourian | 705/14 |

* cited by examiner

*Primary Examiner* — Marilyn G Macasiano
(74) *Attorney, Agent, or Firm* — Schwegman Lundberg & Woessner, P.A.

(57) ABSTRACT

Methods and systems for enhancing a web page are described. Consistent with some embodiments, a content enhancement server analyzes receives a user's web search query submitted to a search engine during a web browsing session. Using the received web search query, the content enhancement server performs various algorithmic operations to select text within a web page being presented to a user for conversion to an interactive link, and/or to select content (e.g., an advertisement) to be presented in connection with the presentation of the web page.

26 Claims, 7 Drawing Sheets

METHODS AND SYSTEMS FOR ENHANCING WEB CONTENT BASED ON A WEB SEARCH QUERY

TECHNICAL FIELD

The present disclosure generally relates to methods, systems and computer program products for data processing in connection with the presentation of web-based content. More specifically, the present disclosure relates to systems and techniques for enhancing an original web page, for example, by adding additional content or modifying the content of the original web page, where the additional content and/or modifications are determined based on an analysis involving one or more web search queries.

BACKGROUND

Over the past decade, the Internet has become an essential source of information for individuals and businesses. The popularity of the Internet as an information resource is due, in part, to the vast amount of available information that can be accessed by almost anyone with access to a computing device. Moreover, the Internet has proven particularly conducive to conducting electronic commerce, and has already proven to provide substantial benefits to both businesses and consumers alike.

Many web services have been developed through which vendors can advertise and sell products directly to potential clients who access their websites. To attract potential consumers to their websites, however, like any other business, requires targeted advertising. One of the most common and conventional advertising techniques applied on the Internet is to provide advertising promotions (e.g., banner ads, pop-ups, ad links, etc.) on the web pages of another website, such that the advertising promotions include links directing an end user to the advertiser's website when the advertising promotion (e.g., the link) is selected by the end user. Typically, an advertiser will select websites that publish information that is somehow related to the advertiser's business.

DESCRIPTION OF THE DRAWINGS

Some embodiments are illustrated by way of example and not limitation in the figures of the accompanying drawings, in which.

DETAILED DESCRIPTION

Figure 1:
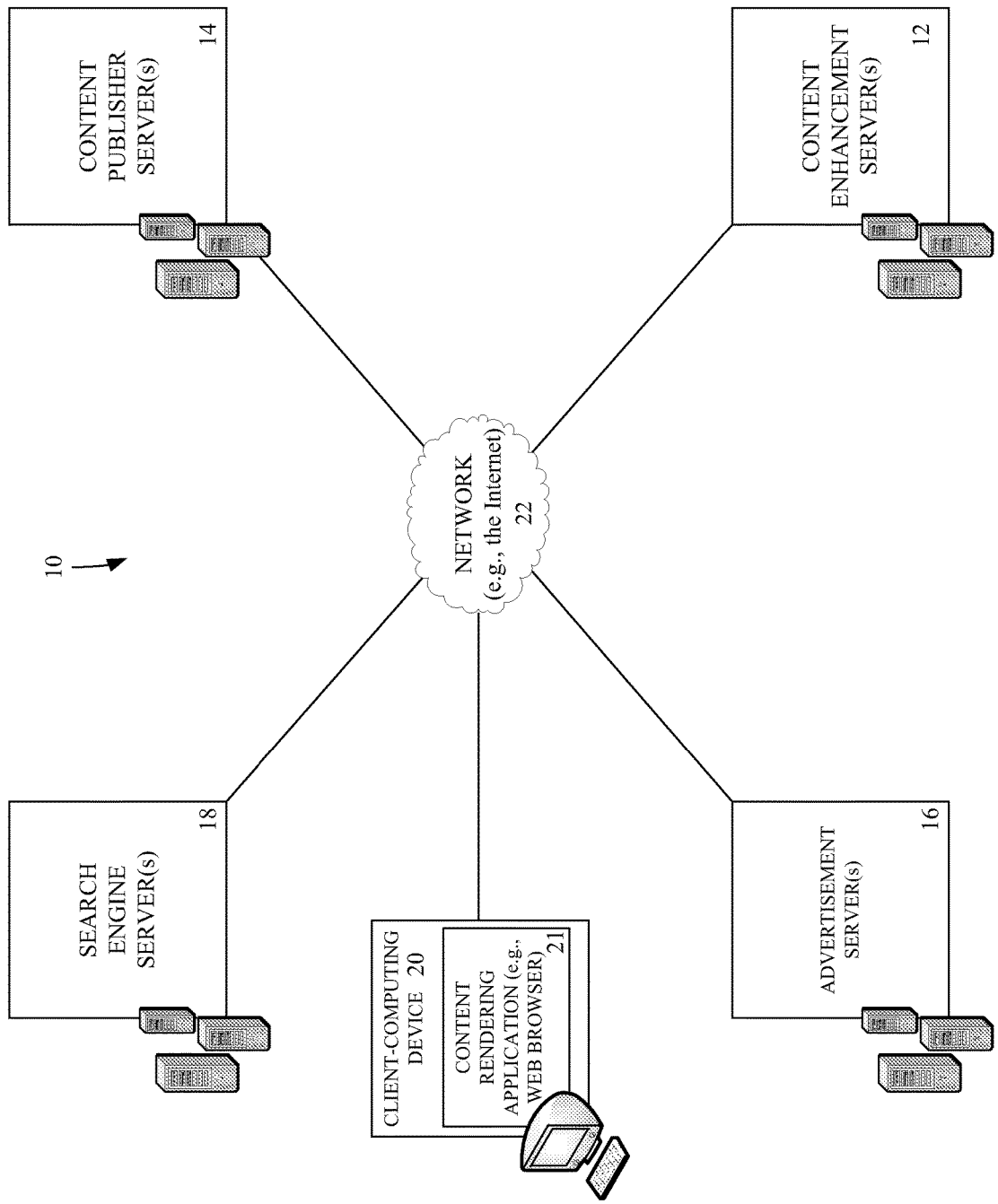
FIG. 1 is a block diagram of a computer network environment showing various computing devices, including a content enhancement server, consistent with some embodiments.

The present disclosure describes methods, systems and computer program products that individually provide mechanisms for enhancing original web-based content presented to a user with modifications and/or additional content that are selected based, at least in part, on an analysis involving one or more web search queries of end-users. In the following description, for purposes of explanation, numerous specific details are set forth in order to provide a thorough understanding of the various aspects of different embodiments of the present invention. It will be evident, however, to one skilled in the art, that the present invention may be practiced without all of the specific details.

Consistent with some embodiments of the present invention, a content enhancement server performs real-time operations to enhance some original web-based content presented to an end-user via a content rendering application (e.g., a web browser application) executing at a client-computing device. The enhancements made to the original web-based content by the content enhancement server may include the presentation of additional web-based content that is selected for its relevance or relatedness to the subject matter of the original web-based content, and in some instances, selected based on the text of a user's web search query, or the text of web search queries of others. In some instances, the additional web-based content may be presented with the original web-based content by directly embedding the additional content into the original web page, such that it is presented right alongside the original web-content. In other instances the additional web-based content may be linked to the original web-based content, such that the additional web-based content is only presented when a user invokes an interactive link (e.g., a hyperlink) included in the original web-based content. For example, consistent with some embodiments, after analyzing the text of a web page being presented at the client-computing device, the content enhancement server may use the text of a user's web search query to select a word or phrase in the original web-based content for converting to an interactive link, which, when invoked by a user, will cause the additional web-based content to be presented.

Consistent with some embodiments, the content enhancement server uses the text of a user's web search query as the basis for selecting the additional content to be presented in connection with the original web-based content, and/or for selecting the words and/or phrases in the original web-based content that are to be converted to interactive links (e.g., hyperlinks) that link the original web-based content to the additional, related content. For example, with some embodiments, during a user's web browsing session the user may submit a web search query to a search engine. The text of the user's web search query may be communicated to or otherwise obtained by the content enhancement server. The content enhancement server will then use the text of the user's web search query as an input to one or more algorithms for enhancing the content of the web page being presented to the user, such algorithms generally being referred to herein as web page enhancement algorithms. Specifically, the text of the user's web search query may be used as an input to a first algorithm for selecting one or more words or phases in the text of the content being presented to the user that are to be converted to interactive links (e.g., hyperlinks), such that, when a user manipulates a cursor control device to interact with a link, additional content is presented to the user. The text of the user's web search query may also be used as input to a second algorithm for selecting the additional content that is presented to a user. For instance, with some embodiments, the text of a user's web search query may be presented to one or more advertisement servers, enabling each advertisement server to select an advertisement to be presented to the user where the selection is influenced by the text of the user's web search query.

With some embodiments, the text of the user's web search query that is used by the content enhancement server as an input to one or more algorithms for enhancing the content of the web page being presented to the user may be from a web search query that was performed by the user in a current web browsing session. For instance, the web search query may have been submitted to a search engine immediately prior to the user being presented with the web page that is currently being viewed by the user, and is subject to being enhanced. However, in other embodiments, the content enhancement server may store the text of a user's previous web search queries, for example, as submitted to search engines in one or more previous web browsing sessions. Accordingly, during a current web browsing session, the text of one or more web search queries submitted by a user during one or more previous web browsing sessions may be used as an input to an algorithm for enhancing a web page being presented to the user. Specifically, the text of a web search query submitted during a previous web browsing session may be used as an input to an algorithm for selecting one or more words or phrases in a currently presented web page, such that the selected words or phrases are converted to interactive links. Similarly, the text of a web search query submitted during a user's previous web browsing session may be used as an input to an algorithm for selecting some additional content to be presented with the currently presented web page.

In certain embodiments, the content enhancement server may select a word or phrase present in a web page being presented to a user to be converted to an interactive link based on an analysis of the text of one or more web search queries performed by others. Similarly, the content enhancement server may select some additional content to be presented to a user based on an analysis of the text of web search queries performed by others. For example, with some embodiments, the content enhancement server will track or record the Uniform Resource Locators (URLs) of the web pages that are selected by users for viewing subsequent to the users submitting a particular web search query. By tracking the URLs of web pages viewed subsequent to performing certain web searches, the content enhancement server can identify when certain web pages are highly correlated with a particular web search query, and when certain web search queries are highly correlated with particular web pages (e.g., URLs). Accordingly, the content enhancement server can identify a particular web page as being frequently selected for viewing subsequent to a user submitting a particular web search query. Similarly, the content enhancement server can identify which web search queries most frequently occur prior to a user viewing a particular web page. If, for example, a particular web search query is determined to frequently occur prior to users viewing a particular web page, then the content enhancement server might use the text of the particular web search query as the basis for selecting a word or phrase in the particular web page for conversion to a link, or for selecting additional content to be presented in connection with the web page, when a user is viewing the web page.

With some embodiments, the content enhancement server will analyse the content of a web page that is presented to a user subsequent to the user submitting a web search query to a search engine for the purpose of identifying the topics to which the web page relates. By analyzing the content of the web page that is selected by, and thus presented to, the user, the content enhancement server can identify topics to which the web page relates, and thereby correlate the text of the web search query with one or more topics. By performing this type of analysis for a large set of users, the content enhancement server can infer a relationship between certain topics and the text of various web search queries. This relationship can then be used by the content enhancement server to select additional content to be presented to a user who is viewing a web page, when the user has not performed a web search query. For example, when a user is viewing a web page, the content enhancement server may analyse the content of the web page to identify one or more topics to which the web page relates. Then, the content enhancement server may identify the text of a web search query previously submitted by a sufficiently large number of users and that is most highly correlated with one or more of the topics of the web page. The identified text for the web search query may then be presented to an advertisement server, enabling the advertisement server to select a relevant advertisement to target the user who is viewing the web page. Various other aspects of the inventive subject matter will be readily apparent from the detailed description of the example embodiments that follows.

FIG. 1 is a block diagram of a computer network environment showing various computing devices, including a content enhancement server 12, consistent with some embodiments of the invention. As illustrated in FIG. 1, the network environment 10 includes a content enhancement server 12, a content publisher server 14, an advertisement server 16, a search engine server 18, and a client-computing device 20, each of which is interconnected via a network 22, for example, such as the Internet. Each individual server shown in FIG. 1 may operate in conjunction with one or more similar servers, such that each of the various services (e.g., search service, advertisement service, content enhancement service, etc.) attributed to a respective server are offered by a cluster of servers. Furthermore, while FIG. 1 shows only a single instance of each service type—that is, one content publishing service provided by the content publisher server 14, one advertisement service provided by the advertisement server 16, and one search service provided by the search engine server 18—the content enhancement server 12 will generally be configured to operate in conjunction with any number of content publisher servers 14, advertisement servers 16, and/or search engine servers 18. Furthermore, while FIG. 1 shows a standalone search engine server 18, the content enhancement server may also operate with one or more search engine services that are associated with specific content publisher servers 14.

In general, a user will interact with a content rendering application 21 (e.g., such as a web browser application)

executing at the client-computing device 20 to direct requests for content to the various servers. In turn, the content rendering application 21 will receive information from the various servers over the network 22, and then process and render the information so that the information can be presented to a user on a display of the client-computing device 20, for example, as a web page. Although illustrated in FIG. 1 as a conventional desktop computer, the client-computing device 20 can take any number of form factors, to include a laptop, notebook, desktop, a mobile phone, a tablet or slate computing device, and others. Similarly, the content rendering application 21 is likely to be a web browser application in some embodiments, but in other embodiments, the content rendering application 21 may be another type of application configured to use web-based protocols. Specifically, with various mobile devices, the content rendering application may be customized to leverage one or more application programming interfaces (APIs) specific to the mobile computing device and that enable the user to control various input mechanisms specific to the mobile computing device.

The search engine server 18 provides a search service, enabling a user of the client-computing device 20 to perform a web search query. The search engine service may be a general web search engine, for example, such as that provided by Google® Inc., of Mountain View, Calif., or the search engine service may provide a specialized search service for searching a particular universe of searchable information, or to perform searches for a particular type of information. For example, the search service may be specific to a particular type of information, such as travel related services, products and services of a particular type, and so forth. Consistent with some embodiments of the invention, when the search engine server 18 receives and processes a user's web search query, the search engine 18 will return a set of search results satisfying the query by communicating a search results page (e.g., a web page) to the requesting client-computing device 20. Typically, each search result will include an interactive link (e.g., a hyperlink) to a web page hosted on a remote server, such as the content publisher server 14.

In general, the content publisher server 14 serves content (e.g., web pages) to content rendering applications 21 executing on various client-computing devices. Embodiments of the present invention are generally independent of the particular nature of the content served by any particular content publisher server 14. As such, the content publisher server 14 may host one or more web sites in the form of web-retail stores, e-commerce marketplaces, news web sites, blogs, social networking services, photo sharing services, or really any other type and format of content. With some embodiments, the web pages hosted at the content publisher server 14 will have embedded tags referencing a script (e.g., a JavaScript) that is itself hosted at a remote server, such as the content enhancement server 12, or a server associated with the content enhancement server 12. When a client-computing device processes a web page including the embedded tag, the corresponding script will be requested, received and processed at the client-computing device. Processing of the script at the client-computing device 20 will invoke the real-time operations performed by the content enhancement server 12 and will ultimately result in the web page, in which the tag is embedded, being enhanced with modifications and/or additional content selected by the content enhancement server 12.

The advertisement server 16 serves advertisements. For instance, a web page hosted at the content publisher server 14 may have an embedded tag referencing the advertisement server. Accordingly, when the web page is served to the client-computing device 20 and processed by the content rendering application 21, the content rendering application 21 may process the embedded tag, causing the client-computing device 20 to request an advertisement from the advertisement server 16. Similarly, the content enhancement server 12 may communicate an advertisement request to the advertisement server with various advertising campaign parameters. For instance, with some embodiments, the content enhancement server 12 may communicate the text of a user's web search query to an advertisement server 16, thereby enabling the advertisement server 16 to select an advertisement to be presented in, or, with a web page that is being presented to a user at the client-computing device 20. Accordingly, when requested, the advertisement server 16 will return to the content enhancement server 12 advertising information. This advertising information will then be processed by the content enhancement server 12, and communicated to the client-computing device 20. In some instances, the advertising information may include a reference (e.g., address or URL) of an advertisement hosted at the advertisement server 16. As such, when the advertising information is received at the client-computing device 20, the content rendering application 21 may request the advertisement from the advertisement server 14, and present the advertisement in the web page presently being displayed. In some embodiments, the advertising information received at the content enhancement server 12 from the advertising server 16 may include the actual advertisement. As such, the content enhancement server 12 may communicate the advertisement directly to the client-computing device 20.

Figure 2:
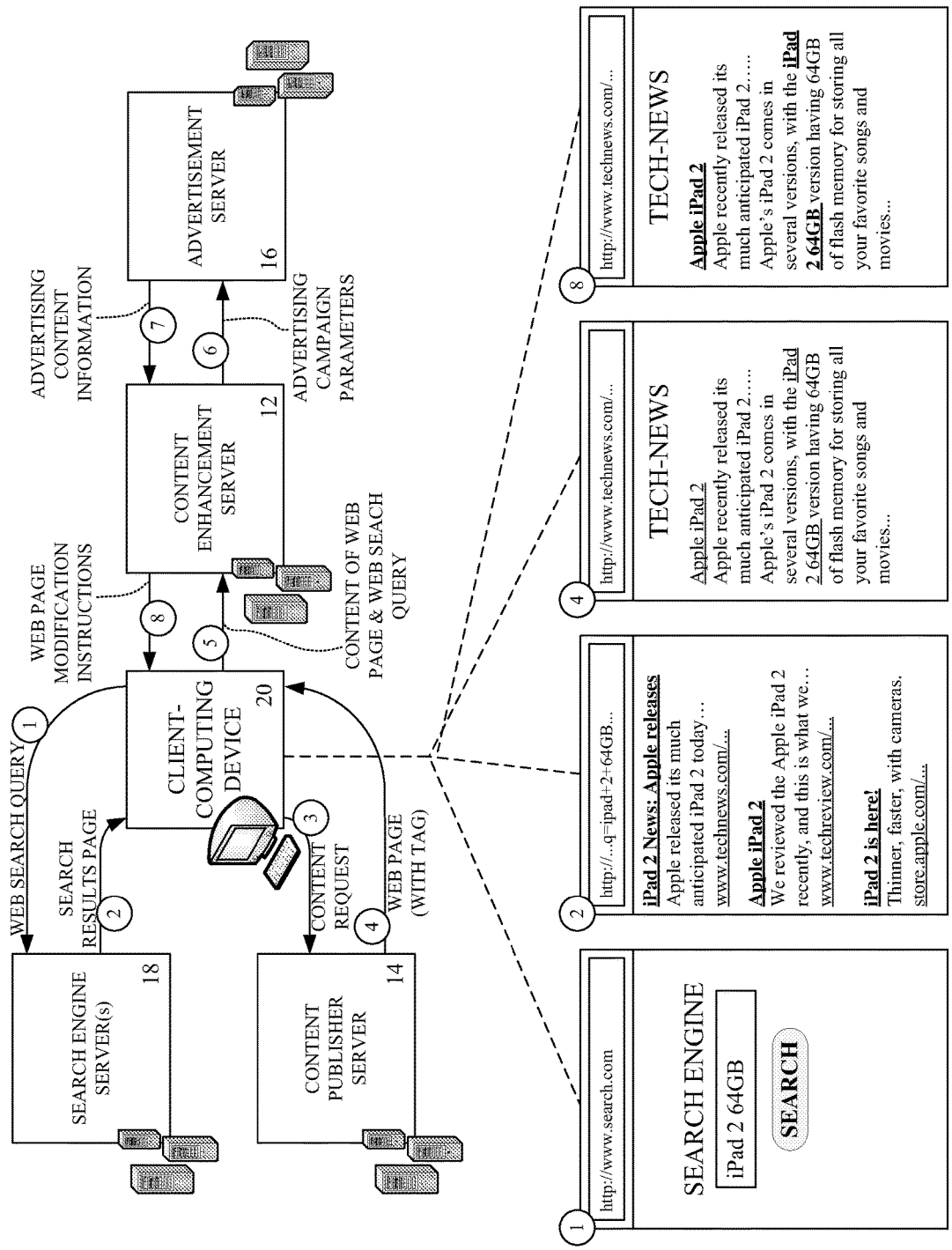
FIG. 2 is a block diagram illustrating several computing devices of a network environment, including a content enhancement server, and specifically showing the data flow that occurs between the various computing devices as part of a technique for presenting enhanced web-based content, according to some embodiments of the invention.

FIG. 2 is a block diagram illustrating an alternative view of the several computing devices of the network environment shown in FIG. 1, including the content enhancement server 12, and specifically showing the data flows that occur between the various computing devices as part of a technique for presenting enhanced web-based content, according to some embodiments of the invention. In FIG. 2, the reference numbers enclosed in circles are used to reference various data flows and corresponding user interfaces associated with such data flows.

For example, as illustrated in FIG. 2 by the arrow (with reference number 1) directed from the client-computing device 20 to the search engine server 18, during a web browsing session a user submits a web search query to the search engine server 18. For instance, as illustrated in the example user interface (with reference number 1), the search engine service has the URL, "www.search.com," and the user submits as a web search query the text "iPad 2 64 GB." After processing the search request, the search engine server 18 communicates a search results page to the client-computing device 20, as indicated by the arrow, and as shown in the example user interface (with reference number 2).

As illustrated in the example user interface (with reference number 2), with some embodiments, the search engine server 18 will include the text of the web search query in the URL corresponding with the search results page that is communicated to the requesting client-computing device 20. For instance, in this example, the user has performed a web search query with the text, "iPad 2 64 GB", and the search engine has included the character string, "q=iPad+2+64 GB" (where "q" is short for query) in the URL of the search results page that is communicated to the requesting client-computing device 20. The particular format of the URL, and the search string containing the text of the user's web search query in particular, will vary amongst various search services.

In this example, the search results page (with reference number 2) shows three different search results. As is typical with many search services, the individual search results presented in the search results page include an interactive link (e.g., a hyperlink) to a resource satisfying the web search query, such as a web page hosted at the content publisher server 14. Accordingly, when a particular search result in the search results page presented by the search engine sever 18 is associated with a web page hosted at the content publisher server 14, when the user selects the interactive link corresponding with the particular search result, the content rendering application at the client-computing device 20 will direct a request for the content to the content publisher server 14 that is hosting the web page. In FIG. 2, this content request is indicated by the arrow (with reference number 3) directed from the client-computing device 20 to the content publisher server 14.

After receiving and processing the content request, the content publisher server 14 communicates a web page to the client-computing device 20. The communication of the web page is illustrated in FIG. 2 by the arrow (with reference number 4) directed from the content publisher server 14 to the client-computing device 20. In this example, the web page includes an embedded tag referencing a script (e.g., JavaScript) that is hosted by a remote server (not shown). For example, the script may be hosted at the content enhancement server 12, or a server associated with an entity that operates the content enhancement server 12. In any case, when the content rendering application executing at the client-computing device 20 receives the web page from the content publisher server 14, the content rendering application processes and renders the web page. In addition, the content rendering application will process the tag embedded in the web page, causing the client-computing device 20 to request and receive the script referenced by the tag.

When the received script is processed by the content rendering application of the client-computing device 20, the script causes the client-computing device 20 to direct a request for enhanced content to the content enhancement server 12, as indicated by the arrow (with reference number 5) directed from the client-computing device 20 to the content enhancement server 12. In addition, processing of the script causes the client-computing device 20 to perform a number of operations that ensure that the content enhancement server 12 has the necessary information for use as inputs to one or more web page enhancement algorithms for enhancing the web page being presented at the client-computing device 20. Specifically, execution of the script at the client-computing device 20 causes the client-computing device 20 to obtain the text of the web search query that was submitted to the search engine server 18, and then communicate the text of the user's web search query to the content enhancement server 12 with the request for enhanced content. For example, the content rendering application at the client-computing device 20 typically will maintain information specifying the resource that included the link to the content that is currently being presented (e.g., the web page with reference number 2). From the point of the view of the web page served by the content publisher server 14, the referring resource is the URL of the search results page served by the search engine 18. With some embodiments, a Hypertext Transport Protocol (HTTP) header field commonly referred to as the HTTP referrer field (frequently misspelled as referer) will store the address of the resource that linked to the currently presented web page. In this example, the HTTP referrer field will store the URL corresponding with the search results page, which includes the character string that identifies the query (e.g., "q=ipad+2+64 GB") that was submitted by the user to the search engine server 18. Consequently, with some embodiments, the script processed at the client-computing device 20 instructs the client-computing device to read and extract the web search query (e.g., "q=ipad+2+64 GB"), if present, from the URL stored in the HTTP referrer header field, and then communicate the text of the web search query to the content enhancement server 12. With some embodiments, rather than extract the text of the web search query at the client-computing device, the script may direct the client-computing device 20 to send the entire URL stored in the referrer field to the content enhancement server 12. In such instances, the content enhancement server 12 will extract the relevant text of the user's web search query from the received URL. With some embodiments, the communication of the text of the web search query to the content enhancement server 12 occurs with the initial request for enhanced content, while in other embodiments, the communication of the web search query occurs subsequent to the initial request for enhanced content. For instance, with some embodiments, upon receiving an initial request for enhanced content, the content enhancement server 12 may communicate a request to the client-computing device 20 for the web search query.

In addition, with some embodiments, the script processed at the client-computing device 20 directs the client-computing device 20 to parse the currently displayed web page and extract the relevant text (e.g., the text of the web page that is presented and viewable via the content rendering application), so that it can be communicated to the content enhancement sever 12 with, or subsequent to, the request for enhanced content. With some embodiments, the entire web page may be communicated from the client-computing device 20 to the content enhancement server 12 as a result of the client-computing device 20 processing the script. Alternatively, portions of the web page may be communicated to the content enhancement server 12 in chunks, either at the request of the content enhancement server 12, or as directed by the script processed at the client-computing device 20. For example, with some embodiments, the content enhancement server 12 will communicate with the client-computing device 20 and request that a chunk (a fixed-size portion of text of the web page) be sent from the client-computing device 20 to the content enhancement server 12, until the content enhancement server 12 determines that it has received all of the web page, or enough of the web page to perform the necessary analysis for enhancing the web page.

With some embodiments, rather than communicating the text of the web page from the client-computing device 20 to the content enhancement server 12, the script processed at the client-computing device 20 directs the client-computing device 20 to send the URL of the web page being presented at the client-computing device to the content enhancement server 12. The content enhancement server can then use the received URL to request a copy of the web page directly from the content publisher server that is hosting the web page. In addition, with some embodiments the content enhancement server 12 may use the received URL as an index to a cache, for example, to determine whether the web page associated with the URL has already been received and analyzed at the content enhancement server 12.

With some embodiments, the content enhancement server 12 may include, or have access to, a cache for caching or storing web pages that the content enhancement server 12 receives and analyzes. Accordingly, with some embodiments, the script that is referenced in the tag embedded in the web page, when processed at the client computing device 20, will direct the client-computing device 20 to generate a unique web page identifier for the presently displayed web page, and then send the web page identifier to the content enhancement server 12. The content enhancement server 12 uses the web page identifier to determine whether the corresponding web page uniquely identified by the web page identifier has already been received and analyzed at the content enhancement server 12. If the content enhancement server 12 has already received and analyzed the web page, the content enhancement server 12 need not request a copy of the content of the web page from the client-computing device 20. With some embodiments, the web page may have been received and analyzed at the content enhancement server 12 as a result of another client-computing device requesting the same web page prior to the current request. With some embodiments, the content enhancement server 12 may include a web crawler, or other similar automated process (sometimes referred to as an automated bot), to systematically request web pages from content publisher servers and then analyze the content of the received web pages. As such, a web page may already be in the cache accessible to the content enhancement server 12 as a result of the web crawler already having requested the web page.

The cache accessible to the content enhancement server 12 may store a copy of each web page that the content enhancement server 12 receives and analyzes. In addition, or alternatively, the cache may store only the results of some analysis of the web page performed by the content enhancement server 12. For instance, as discussed below, a web page may be analyzed to determine one or more topics to which the web page relates, and/or to identify one or more words or phrases in the text of the web page that are eligible as candidates to be converted to interactive links. Furthermore, after the content enhancement server 12 selects the words or phrases to be converted to interactive links, and selects the content to be presented with the web page, the content enhancement server 12 will generate web page modification instructions, which, when processed at the client-computing device 20, will direct the client-computing device 20 to modify the presentation of the web page. With some embodiments, the topics to which the web page relates, as well as the words or phrases selected as candidates for being converted to interactive links, and the web page modification instructions, are all stored in the cache along with one or more timestamps indicating, for example, the time at which the content enhancement server 12 last analyzed the web page, or, the time at which the web page was last received at the content enhancement server 12. Of course, with some embodiments, some subset or combination of the aforementioned information may be stored in the cache. In any case, by storing the results of the analysis performed on a particular instance of a web page, the content enhancement server 12 can leverage the previous analysis of the web page when generating web page modification instructions for the same web page (e.g., a second instance of the web page), thereby speeding up the process by which a web page is enhanced.

Accordingly, with some embodiments, execution and/or processing of the script that is referenced in the tag of the web page presently being displayed at the client-computing device 20 will result in the client-computing device 20 sending to the content enhancement server 12 one or more of: the text of a user's web search query, the URL of the web page being presented, a web page identifier uniquely identifying the content of the web page, and/or the extracted text of the web page itself. As shown in FIG. 2, the communication of this information is represented by the arrow (with reference number 5) directed from the client-computing device 20 to the content enhancement server 12.

Once the content enhancement server 12 has received the text of the user's web search query, and either received the content of the web page from the client-computing device 20, or accessed a copy of the web page as stored in a cache, the content enhancement server 12 will analyse the web page to determine how the web page is to be enhanced. Although a variety of web page enhancement algorithms might be used to determine how to enhance the web page, with some embodiments, the text of the user's web search query is used as an input to one or more algorithms for selecting a word or phrase to be converted to an interactive link, and/or for selecting some additional content (e.g., an advertisement) to be presented with the web page.

With some embodiments, the analysis may begin by first determining whether the request for enhanced content includes or specifies the text of a user's web search query. If the request for enhanced content does not include the text of a user's web search query (e.g., because the user has not recently submitted a web search query to a search engine), the content enhancement server 12 may select one or more words or phrases in the text of the web page to be converted to interactive links, and select content to be presented when a link is invoked, based on an analysis of the content of the web page. In some embodiments, the content enhancement server 12 may use the text of other users' web search queries to select words and/or phrases to be converted to interactive links, and content to be presented with the web page. Such algorithms are described in greater detail below, in connection with the description of FIGS. 4 and 5.

If the request for enhanced content received by the content enhancement server does include, or is associated with, text of a user's web search query (e.g., indicating that the user has recently performed a web search), the content enhancement server 12 may first determine whether the text of the web search query occurs within the text of the web page that is being presented to, and viewed by, the user. For example, if the web search query is "iPad 2 64 GB", the content enhancement server 12 may analyze the text of the web page to determine if the phrase, "iPad 2 64 GB" occurs in the web page. With some embodiments, the content enhancement server 12 will attempt to find exact or partial matches of the text of the web search query. Accordingly, the text of the web search query may be processed to identify similar word forms, and such, when appropriate, for the purpose of matching the text of the web search query with the text of the web page.

In addition to determining whether the text of the user's web search query occurs in the web page, the content enhancement server 12 may analyze the text of the web page to determine one or more topics to which the web page relates, and to identify one or more alternative words and/or phrases in the web page that may be converted to interactive links. This analysis is described in greater detail below in connection with the description of FIG. 3.

After the content enhancement server 12 has identified one or more occurrences of the text of the user's web search query in the web page, and determined one or more topics to which the web page relates, the content enhancement server 12 will use this information as input to a web page enhancement algorithm for selecting additional content to be presented with the web page. With some embodiments, the content enhancement server 12 will use the information (e.g., the text of the user's web search query, and the identified one or more topic) as advertising campaign parameters that are communicated to one or more advertising servers. For instance, referring to FIG. 2, the communication of the advertising campaign parameters from the content enhancement server 12 to an advertisement server 16 is indicated by the arrow (with reference number 6) directed from the content enhancement server 12 to the advertisement server 16. Although in FIG. 2 only one advertisement server is shown, with some embodiments, the advertising campaign parameters may be communicated to several advertisement servers. The advertisement server 16 uses the received advertising campaign parameters to determine whether any advertisers are interested in having an advertisement presented in connection with the presentation of the web page to the user. For instance, with some embodiments, advertisers bid on the opportunity to have advertisements automatically embedded into, or otherwise presented with, a web page that has certain characteristics, as specified by the advertising campaign parameters. In this case, the characteristics on which an advertiser may bid include, at least in part, the text of a user's web search query and/or the topics to which the web page relates. For example, an advertiser may bid to have an advertisement appear in a web page when the user viewing the web page has recently submitted some text as a web search query to a search engine. In addition, the advertiser may optionally select various topics to which a web page must or should relate in order for the advertiser's advertisement to appear in or with (e.g., linked to) the web page. With some embodiments, information about the user who is viewing the web page may also be communicated to the advertisement server 16 for use as an advertising campaign parameter. Accordingly, with some embodiments, an advertiser may bid to have advertisements presented in connection with web pages having certain characteristics and when the viewer of the web page matches some desirable demographics (e.g., age, sex, race, interests, location, etc.).

As indicated by the arrow (with reference number 7) directed from the advertisement server 16 to the content enhancement server 12, after the advertisement server 16 has identified advertising content information associated with a particular advertisement and advertiser, the advertising content information is communicated to the content enhancement server 12. Assuming the content enhancement server 12 receives advertising content information from more than one advertisement server, the content enhancement server 12 will analyze the different information received to select one or more particular advertisements to be presented in connection with the web page. In addition, with some embodiments, the content enhancement server 12 may analyze the received advertisement content information to determine whether an advertisement has been selected by an advertisement server based on the text of the user's web search query, as this may affect the word or phrase that is selected for conversion to an interactive link. For example, if an advertisement server has selected a particular advertisement to be presented in connection with the web page based on the user having performed a web search query with the text, "iPad 2 64 GB," the content enhancement sever 12 may generate web page modification instructions to convert the phrase, "iPad 2 64 GB," to an interactive link, which, when invoked, will cause the client-computing device 20 to present or display the selected advertisement.

Finally, once the content enhancement server has analyzed all of the advertising content information received from the various advertisement servers, and selected one or more specific advertisements for presentation with the web page, the content enhancement server 12 generates web page modification instructions and communicates the web page modification instructions to the client-computing device 20, as indicated in FIG. 2 by the arrow (with reference number 8) directed from the content enhancement server 12 to the client-computing device 20. With some embodiments, the web page modification instructions are a script (e.g., JavaScript) and will instruct or otherwise direct the content rendering application executing at the client-computing device 20 to modify or convert one or more specific words or phrases occurring in the web page to interactive links, such that each link, when invoked, is to present selected content, such as an advertisement. In the example of FIG. 2, the user interface with reference number 8 shows that the web page relating to "TECH-NEWS" has been modified to show the words, "Apple iPad 2" and "iPad 2 64 GB" as interactive links. In this example, when a user selects or otherwise interacts with one of these interactive links (e.g., by positioning a cursor at, or over, a link, or selecting the link), an advertisement may be presented in a separate user interface element, such as a pop-up window, a new window, a new web-browsing tab, or some similar user interface element. Alternatively, detection of a particular event, such as selection of the link, may result in the content rendering application executing at the client-computing device 20 to direct a request for a new web page to a remote content server, such that the new web page will replace the current web page, or appear in a new window or web-browsing tab.

The various operations illustrated and described in connection with FIG. 2 occur in real-time, such that, from the perspective of a user viewing the web page, the modification of the original web page to include the interactive links goes essentially unnoticed. In addition, with some embodiments, the operations may differ, or be performed in a different order, from what is shown and described in connection with FIG. 2. Specifically, with some embodiments, the text of a user's web search query may be used to select content that is embedded directly in the web page, as opposed to being presented in pop-up windows that appear upon invoking interactive links. With some embodiments, the selected content may not be advertising information, but other information that relates to and enhances the content of the original web page. For example, with some embodiments, when a user performs a web search query for a particular person, place, or event, information relating to that person, place or event may be selected for presentation with a web page that is presented to the user. Finally, at least with some embodiments, the content selected for presentation with the web page may be selected directly by the content enhancement server 12, without forwarding advertising campaign parameters to an advertisement server 16. For instance, with some embodiments, the functionality of the advertising server 16 may be integrated with the content enhancement server 12, such that the entire content selection algorithm occurs at the content enhancement server 12. In other instances, the content selected may not be advertising information, and the content selection algorithm may occur entirely at the content enhancement server 12. For example, with some embodiments, the content selected by the content enhancement server for presentation with the web page may be information (e.g., text, graphics, pictures, video, audio, etc.) that relate to the text of the web search query and/or one or more topics to which the web page relates.

Consistent with some embodiments, when a request for enhanced content is received at the content enhancement server 12, and the request includes text of a recently performed web search query (indicating the user viewing the web page at the client-computing device has recently performed a web search), the content enhancement server 12 will first determine whether the text of the web search query should be used as input to an algorithm for selecting a word or phrase in the web page for conversion to an interactive link (e.g., a hyperlink), and/or an algorithm for selecting content to be presented with the web page. Because only some web search queries prove useful for inferring a user's ultimate intention, with some embodiments, the content enhancement server 12 will only use the text of some web search queries as input to an algorithm for enhancing a web page. For example, with some embodiments, the content enhancement server 12 may maintain a list (e.g., in a database) identifying specific web search queries that qualify for use as input with one or more web page enhancement algorithms. When a content enhancement request is received at the content enhancement server 12 along with the text of a web search query, the content enhancement server 12 may first identify whether the received web search query is included in the list of eligible web search queries. If so, then the content enhancement server 12 will determine whether the web page includes any occurrences of the web search query. With some embodiments, if the web page includes one or more instances of the web search query (e.g., text in the web page matches, exactly or partially, the text of the web search query), then one or more of these instances of the web search query may be selected for conversion to interactive links, or may be identified as eligible for conversion to interactive links. With some embodiments, the content enhancement server 12 may maintain a set of words and/or phrases associated with the text of one or more web search queries. Accordingly, when a particular web search query is used as an input to identify a word or phrase in the web page for conversion to an interactive link, if the text of the web search query is not present in the web page, a word or phrase in the set of words and/or phrases that are associated with the text of the web search query may be selected for conversion to an interactive link.

With some embodiments, the content enhancement server 12 may analyze the URL or web page identifier associated with the web page that is being presented at the client-computing device 20 (as received from the client-computing device 20 with the content enhancement request) to determine whether a web search query should be used as input to an algorithm for enhancing the web page. For instance, with some embodiments and/or in some instances, the content enhancement server 12 may only use the text of a web search query as the basis for modifying or enhancing certain web pages. As such, the content enhancement server 12 may maintain a list (e.g., with a database) of web pages that are to be enhanced, or a separate list of web pages that are not to be enhanced, with web page enhancement algorithms that use as input the text of a web search query. As discussed in greater detail below, with some embodiments the content enhancement server 12 may associate the text of a web search query with one or more topics, using a topic taxonomy. Accordingly, with some embodiments, the content enhancement server may only use web search queries as input to a web page enhancement algorithm when the web search queries are associated with or relate to some specific topics. With some embodiments, the content enhancement server may use a user's web search query as an input to a web page enhancement algorithm only when the web search query was submitted to a particular search engine or search service. Accordingly, if the search engine or search service is known to provide search results of a particular type or nature, the content selected by the content enhancement server can be tailored to the nature of the search engine. For example, if a user submits a web search query to a map search service, the content enhancement server may tailor the algorithms used to enhance the web page such that the content selected for presentation with the web page is likely to be of interest to a user who is using a map search service.

Figure 3:
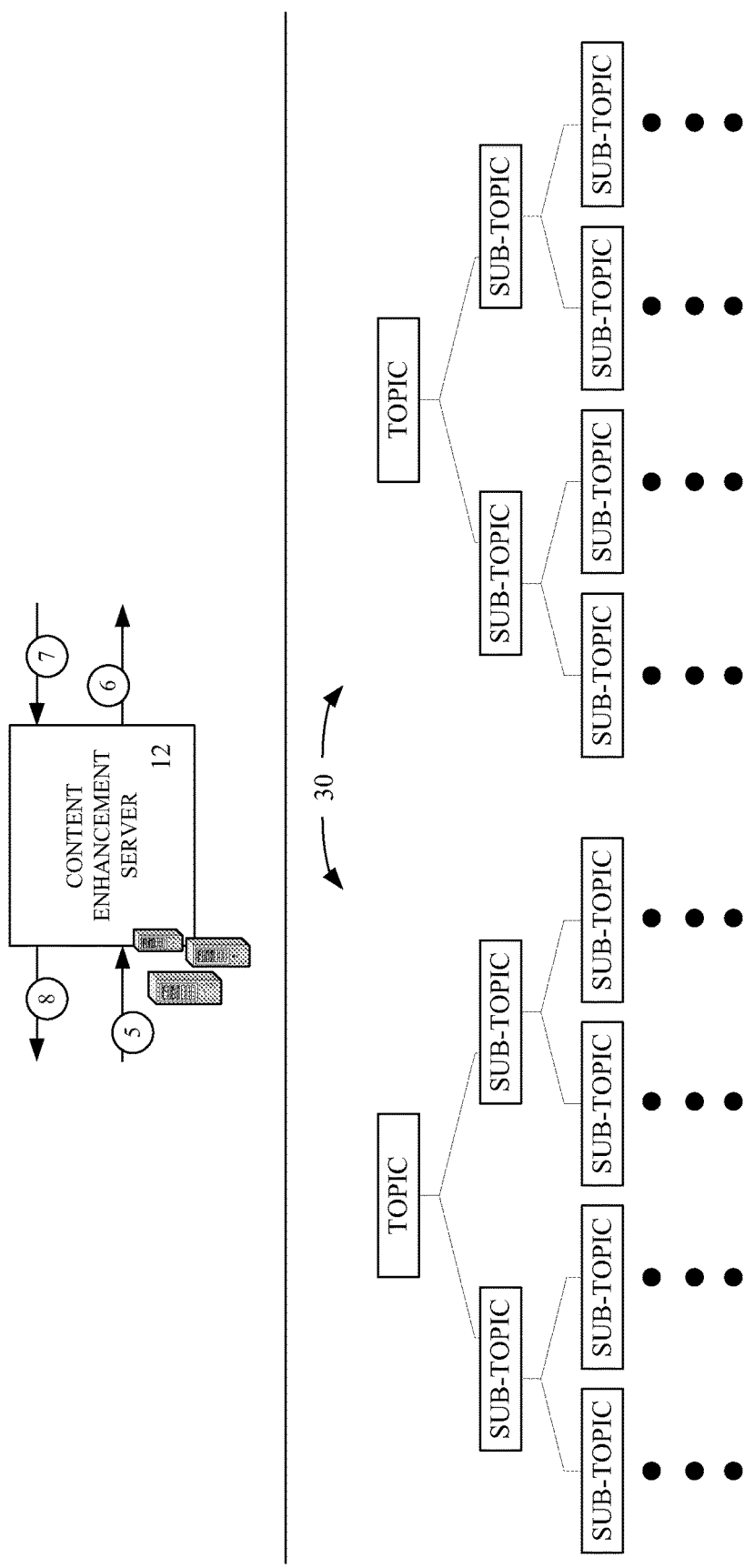
FIG. 3 is a block diagram of a dynamically generated topic taxonomy that is used by a content enhancement server, consistent with some embodiments, to categorize web pages and identify the topics to which web pages and other items of content relate.

As illustrated in FIG. 3, with some embodiments, the content enhancement server 12 maintains a taxonomy of topics that the content enhancement server 12 uses when assessing a web page (or other web-based content) to identify the topics to which the web page or content relates, for example, based on a statistical analysis of the text of the web page or content. For instance, with some embodiments, the content enhancement server 12 may use as input to a web page enhancement algorithm the text of a web search query only when the web page being enhanced is determined to be associated with certain topics. When a content enhancement request is received at the content enhancement server 12, and the content enhancement request includes the text of a web search query, the content enhancement server 12 will analyze the content of the web page to identify the topics to which the web page relates. With some embodiments, the text of a web search query may be used as input to a web page enhancement algorithm only when the web page is associated with or relates to certain topics, as determined by the content enhancement server 12 using the taxonomy of topics. For example, if a user's web search query is or includes the word, "Apple," this web search query may be used as input to an algorithm for selecting words or phrases in the web page for conversion to interactive links when a topic of the web page is determined to be "Computers" or "Consumer Electronics." However, if the content enhancement server determines the topic of the web page to be "Health" or "Food and Dining" then the text of the web search query may not be used as an input to selecting words or phrases in the web page for conversion to interactive links, and/or for selecting content to be presented with the web page.

As discussed briefly above, consistent with some embodiments, in addition to using the text of a web search query as input to an algorithm for enhancing a web page, the topics to which a web page relates are also used in the selection of words and/or phrases in the web page to be converted to interactive links, and/or for the selection of additional content to be presented in connection with the presentation of the web page. For example, with some embodiments, the content enhancement server 12 performs various statistical analyses of web pages and other content to determine to what degree two or more items of content are related to one another. The degree of relevancy or relatedness of two web pages, or a web page and another item of content (e.g., an advertisement) may be used in making a determination as to whether to link the content items. For example, after the web page being presented by the client-computing device 20 has been transmitted to, or otherwise identified by, the content enhancement server 12, the content enhancement server 12 performs a statistical analysis of the text of the web page. The statistical distribution of words and/or phrases in the content of the web page may be determined and scored against a taxonomy of topics stored in a database accessible to the content enhancement server 12. The content enhancement server 12 determines a score indicating how related the web page is to each topic in the taxonomy. This may be compared to the scores for other web pages, or items of content, that are candidates for being matched or linked to the original web page, for example, via an interactive link being inserted in the web page. The similarity in scores between two web pages, or the web page and another item of content (e.g., an advertisement) may be used to determine whether those two items should be matched or linked. For example, the content enhancement server 12 may determine that a web page being presented at the client-computing device 20 is related to the same or similar sets of topics as another web page, or another item of content, such as an advertisement. As a result, the content enhancement server 12 may cause a link to the related web page to be inserted into the text of the web page being presented at the client-computing device 20. The content enhancement server 12 can select a word or phrase in the web page that relates to the topics of both the web page and the other related web page or item of content that has been identified. With some embodiments, the word or phrase selected for conversion to a link may be selected because the word or phrase matches, exactly or partially, the text of a user's web search query. The content enhancement server 12 can then cause the word or phrase in the web page to be converted to an interactive link (e.g., hyperlink), that links the two related web pages, or the web page and other item of content.

With some embodiments, the content enhancement server 12 uses the topic taxonomy to identify topics to which the web page relates, and then communicates these topics, with the text of a user's web search query, to an advertisement server, thereby enabling the advertisement server to identify an advertisement or web page to be linked, or presented, with the original web page that is being presented at the client-computing device 20. Accordingly, the advertisement server will use the topics of the web page, and/or the text of the user's web search query to select one or more advertisements and/or web pages for linking, or presenting with the original web page. The advertisement server will then communicate information corresponding with the selected advertisements or web pages to the content enhancement server 12. In turn, the content enhancement server 12 will select or identify one or more words or phrases in the web page to be converted to interactive links, linking the original web page with the one or more selected advertisements or additional web pages.

In an example embodiment, the web pages analysed by the content enhancement server 12 are scored against each of the topics in the topic taxonomy accessible to the content enhancement server 12. In one example, the score for each topic may be normalized and represented by a number between 0 and 1. The resulting list of scores is a vector representing the relatedness of the web page to the topics in the taxonomy. For example, if there were only three topics in the taxonomy (such as Health, Politics and Sports), the scores would be a vector of three numbers <x, y, z> based on the occurrence of words and/or phrases in the page that relate to each topic. The vector for one web page <x1, y1, z1> may be compared to the vector for another web page or item of content <x2, y2, z2> to determine how related the two are. In this simplified example, the relatedness can be determined by the distance between the two vectors in three dimensional space (the distance between the point <x1, y1, z1> and the point <x2, y2, z2>. In actual practice, the topic taxonomy may have 10, 100, 1000 or more topics. The number of topics, n, would result in an n-dimensional vector for each web page, or item of content, being scored that indicates the relatedness of the content item to the topics in the taxonomy. These vectors may be compared to determine to what degree two web pages or other items of content are related. A cosine similarity or other technique may be used to compare the vectors in example embodiments to determine how related one web page is to another web page or item of content based on the topic taxonomy. This "relatedness score" can then be used as a factor in selecting web pages or other items of content (e.g., advertisements, or a landing page associated with an advertisement) to be matched or linked for various purposes.

For example, with some embodiments, the content enhancement server may be used to insert interactive links in a web page that links the web page to advertisements. The web page and the candidate advertisements may be scored against the taxonomy and the resulting vectors may be compared to determine a "relatedness score" between the web page and the advertisement. An advertisement may be scored against the taxonomy by analyzing and scoring the text (words and phrases) in the advertisement copy itself and/or in metadata associated with the advertisement and/or based on the text of a landing page associated with the advertisement and/or based on web pages for the entity who sells the product or service being advertised. One or more of these sources of information about the advertisement may be analyzed and the words and phrases in those sources may be scored against the taxonomy to generate a vector of topic scores for the advertisement. Alternatively, with some embodiments, the topic taxonomy may be used to identify the topics to which the web page relates, and a user may manually select the topics to which the other content (e.g., advertisements) relates. An advertisement to be displayed or linked on a web page may be selected based, at least in part, on how related the web page is to the advertisement. Other factors may also be taken into account, such as the expected value for the advertisement (based on historical click through rates and cost per click for the advertisement), as well as the text of a user's web search query.

With some embodiments, other content such as videos or graphics may also be scored, matched and/or linked. The words and/or phrases in metadata associated with the video (such as a title, description or transcript) or graphics may be analyzed and scored against the taxonomy. The resulting topic vector can then be compared against the topic vector for web pages, advertisements or other content.

Individual words and phrases can also be scored against the topic taxonomy. The scores may be based on the number of times that a particular word or phrase occurs in a web page (or in other content) associated with the topic. This is a statistical distribution of the occurrences of the word or phrase across the topics in the taxonomy. As web pages are analyzed, the count (the occurrences of the word or phrase in each topic) may be dynamically updated. The topic vector for a particular word or phrase may then be compared against the topic vector for the source web page or a target web page being considered for matching or linking (based on cosine similarity or other technique).

As an alternative to using the text of a web search query to identify words or phrases in a web page for conversion to interactive links, the related score for particular words and/or phrases on a web page (or other content) may be used to determine whether to use a particular word or phrase to link two pages (or other content). For example, the content enhancement server may determine that a web page is related to candidate advertisements. The system may consider one or more words and/or phrases in the web page for linking the web page to one or more candidate advertisements. The related score between the source web page and the advertisement, the related score between the words and/or phrases and the source web page, and the related score between the words and/or phrases and the source web page, may all be considered in determining which advertisement to select and how to link the advertisement to the source web page. Other factors may also be considered in determining which advertisement and word or phrase to select. For example, as discussed above, with some embodiments a word or phrase may be selected because it matches the text of a user's web search query. Additionally, the expected value for the advertisement may also be considered (for example, the historical click through rate for the word and/or phrase, and/or the cost per click that will be paid when the word/phrase or advertisement is selected).

Similarly, two web pages may be linked or a web page may be linked to other related content such as a text box or video or graphic display. The related score between the source content and the target content, the related score between the word/phrase and the source content, and the related score between the word/phrase and the target content may all be considered in determining which target content to select and how to link the target content to the source content. Other factors may also be considered in determining which advertisement and word/phrase to select. For non-advertising content, there may be no expected value based on payments for selecting the content. However, the quality of the word/phrase and the target content may be considered based on the historical likelihood of that item being selected when it is linked through the particular word/phrase.

In one example embodiment, the candidate content items for linking as targets and the word/phrase to be used for linking the content with the original web page are selected based on an overall related score that is based on a weighted sum of the related score of source/target, the related score of the word/phrase and source, and the related score of the word/phrase and target, and a score related to the text of a user's web search query. The weightings for these three factors may be selected based on a relative emphasis to place on each of these factors in making the selection. In an example embodiment, the three weights are normalized and add up to one. The overall related score may be added to an expected value and/or quality score (based on expected value, expected click through rate or other factors indicating the desirability of the particular selection). The resulting total score can be used to select the target and word/phrase for linking. In an example embodiment, linking words/phrases and target candidates may be selected that have the highest total score. This is an example only and other embodiments may use other methods for selecting the target and linking phrase based on one or more of the above factors.

In one example, items are linked to a source web page (or other content item) through a word or phrase on the web page. For instance, with some embodiments, this word or phrase may be selected because it matches, exactly or partially, the text of a web search that a user has performed just prior to requesting and viewing the web page. The word or phrase may be ordinary text and may be selected and converted into an interactive link that is displayed on the web page in some discernible way, such as underlined, italicized, shown in a different color, size or font, and so forth. When an event associated with the interactive link is detected (e.g., such as when the user selects the link), the user may be directed to the target web page associated with the link, or presented with some other item of content. In some embodiments, when the link is selected or when a mouse is positioned over the highlighted keyword/keyphrase, a dynamic overlay layer (such as a pop up layer or window) may be displayed. The target content may be displayed in the dynamic overlay layer. The target content may be an advertisement with text, graphics and/or video as well as a link to a landing page for the ad (such as a vendor's web site). There may also be more than one item of target content displayed in the dynamic overlay layer. For example, in some embodiments, the dynamic overlay layer may display one or more ads, one or more links to related web pages or other related content, one or more related graphics and/or one or more related videos (which may be played in a box in the dynamic overlay layer). The number and types of target content to display may be determined based on preferences or settings indicated by a particular publisher who provides the source web page or by the system administrator or by an advertiser or by some other setting. The system may select the individual target content items to be displayed in the dynamic overlay layer based on a total score for each item as described above (based on related score of source/target, related score of word/phrase and source and related score of word/phrase and target, and other factors such as expected value, quality, occurrence of web search query in text of web page, etc.). The highest scoring items of each type (ads, links to related sites, related videos, etc.) may be selected for the dynamic overlay layer.

Figure 4:
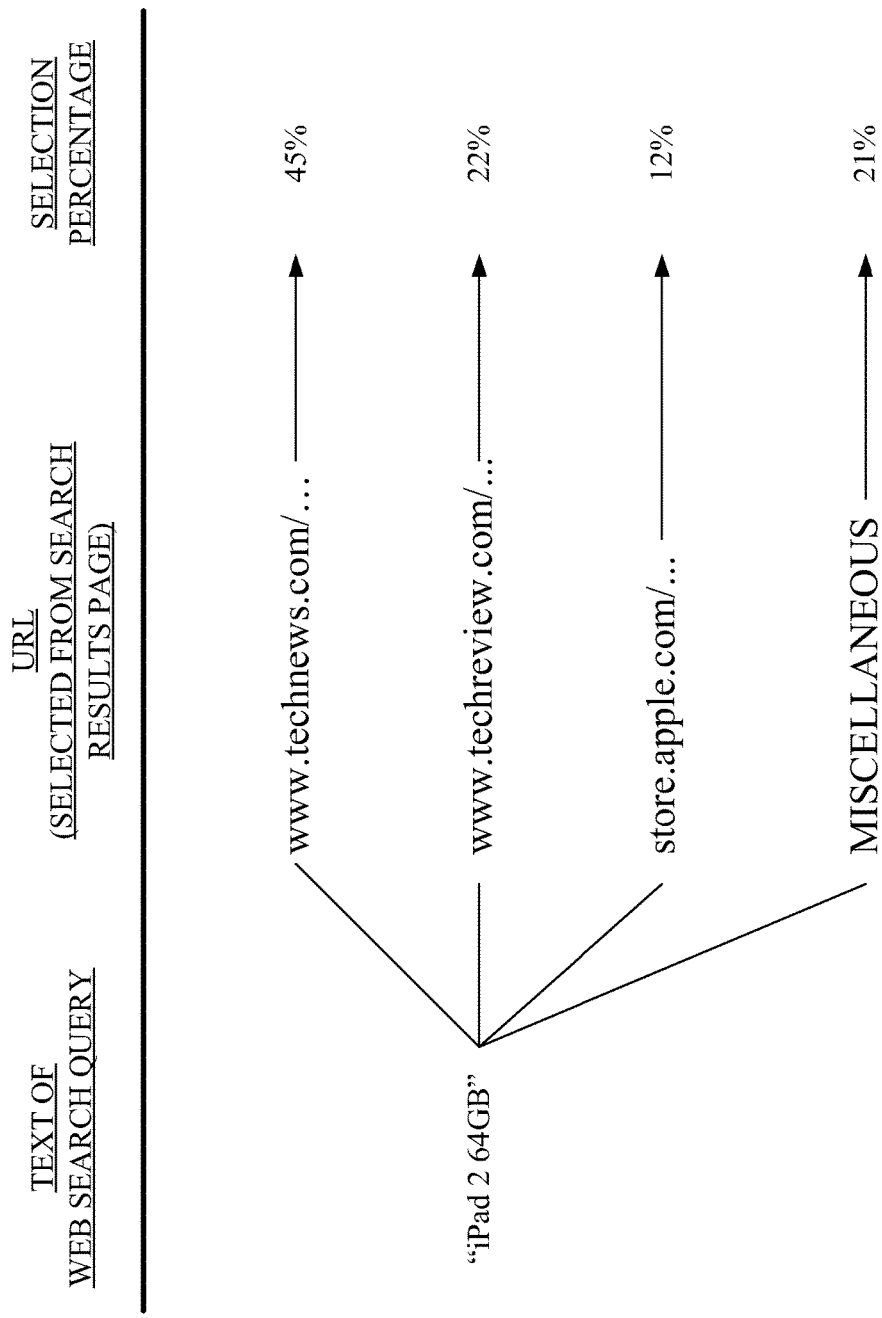
FIG. 4 is a diagram illustrating an example of the relationships between a web search query and various Uniform Resource Locators (URLs) of web pages as established by analyzing information received at a content enhancement server, consistent with some embodiments.

FIG. 4 is a diagram illustrating an example of the relationships between a web search query and various URLs of web pages as established by analyzing information received at a content enhancement server, consistent with some embodiments. For example, with some embodiments, each time a content enhancement request is received at the content enhancement server, the content enhancement sever identifies whether a web search query is associated with the request. If a web search query is included with the content enhancement request, the content enhancement server identifies the URL or web page identifier of the web page that is to be enhanced. The content enhancement server will update a database in which the correlation of web search queries and corresponding URLs is maintained. For instance, in the example illustrated in FIG. 4, based on a historical analysis of content enhancement requests received at the content enhancement server, the content enhancement server has determined that users select for viewing the web page associated with the URL, "www.technews.com/ . . . ," forty-five percent of the time, after performing a web search query with the phrase, "iPad 2 64 GB." Similarly, users tend to select the web page with URL, "www.techreview.com/ . . . " twenty-two percent of the time, after performing a web search query with the phrase, "iPad 2 64 GB." Finally, as shown in FIG. 4, users selected the web page with URL, "store.apple.com/ . . . " only twelve percent of the time, after performing a web search query with the phrase, "iPad 2 64 GB."

Figure 5:
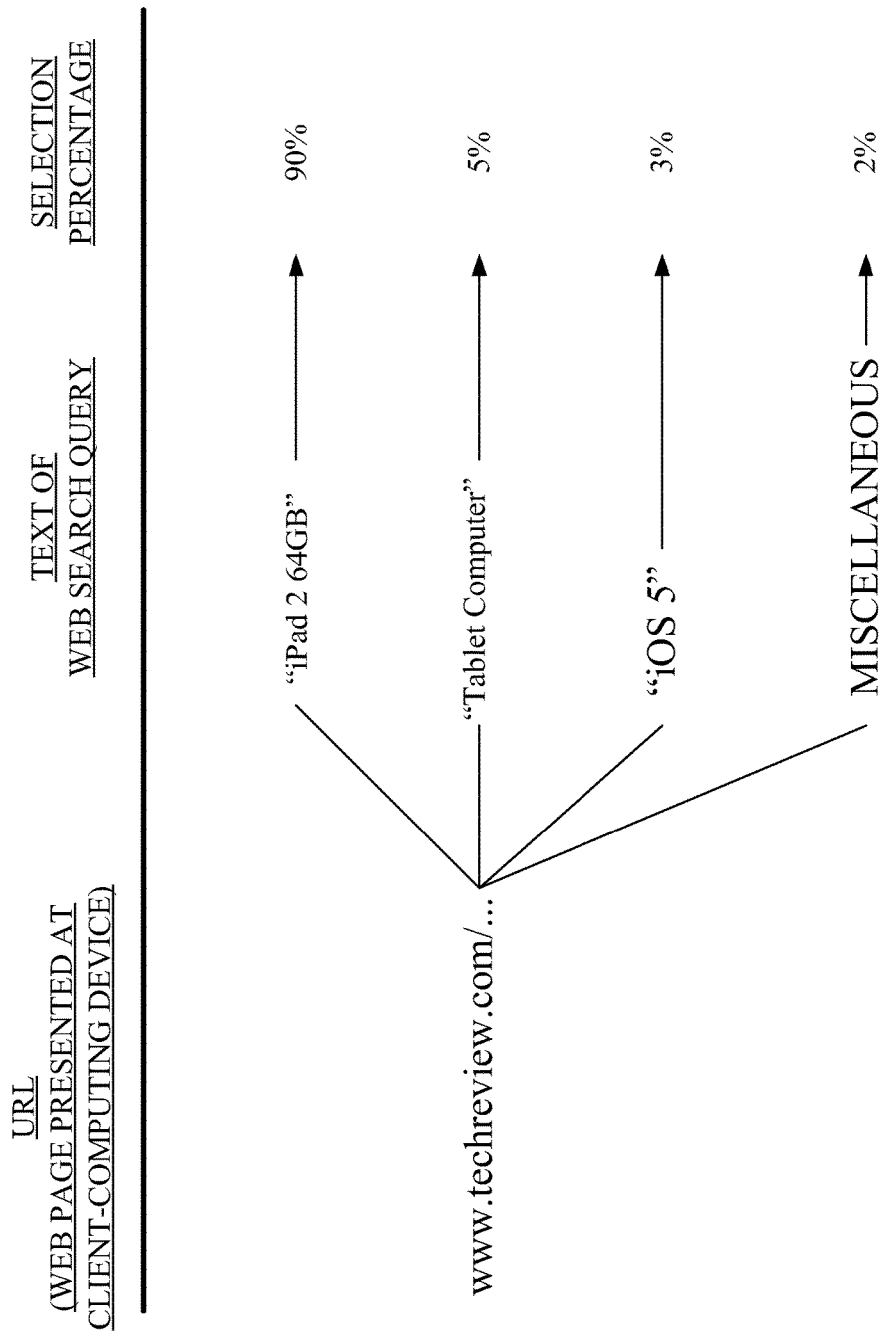
FIG. 5 is a diagram illustrating an example of the relationships between a URL and the text of various web search queries as established by analyzing information received at a content enhancement server, consistent with some embodiments.

Using the information identifying the correlation between web search queries and selected web pages, the content enhancement server can identify the web search queries that are the most highly correlated with a particular web page, or URL. For instance, as illustrated in FIG. 5, the content enhancement server will identify all of the web search queries that have been received with content enhancement requests for a particular web page or URL. As shown in FIG. 5, the web page with URL, "www.techreview.com/ . . . " is most frequently selected for viewing after performing a search with the web search query, "iPad 2 64 GB."

Accordingly, with some embodiments, a user of a client-computing device may view a web page during a web browsing session without performing a web search query. For example, a user may select a link to a particular web page, or may type the URL of the particular web page into an address bar of a web browser, thereby generating a request for the web page. When the particular web page that is requested includes an embedded tag referencing a script hosted at the content enhancement server, or a separate server under the control of the same entity operating the content enhancement server, the referenced script is communicated to the client-computing device where it is processed. The processing of the script will result in a content enhancement request being communicated from the client-computing device to the content enhancement server. However, because the user has not performed a web search query, the content enhancement request will not include or be associated with a web search query. The content enhancement request will, however, include the URL of the web page, or a web page identifier uniquely identifying the web page. Accordingly, when the content enhancement server receives the content enhancement request, the content enhancement server may identify the web search queries that are most highly correlated with the URL of the web page that is being presented at the client-computing device. In certain instances, such as when there is a particularly strong correlation between a certain web search query and a particular web page, the web search query may be used as input to a web page enhancement algorithm for selecting additional content (e.g., an advertisement) to be presented in connection with the web page, or for selecting a word or phrase to be converted to an interactive link, linking the web page to the selected content. For instance, with some embodiments, the most highly correlated web search query may be communicated to an advertisement server, enabling the advertisement server to select an advertisement for presentation with the web page based on the text of the web search query that is most highly correlated with the web page, even though the user viewing the web page did not himself perform a web search query.

With some embodiments, in addition to identifying relationships between web search queries and URLs or web pages, the content enhancement server may identify and maintain information about the relationship between various web search queries and the topics of web pages. For instance, when the content enhancement server receives a request to enhance a web page, and the request is associated with or includes the text of a web search query, the content enhancement server may analyze the web page to identify the topics to which the web page relates. The content enhancement server will then update relationship information identifying the topics to which the particular web search query relates. If a particular web search query is identified as being highly correlated with one particular topic, then this topic may be used as the basis for selecting additional content to present with a web page.

Figure 6:
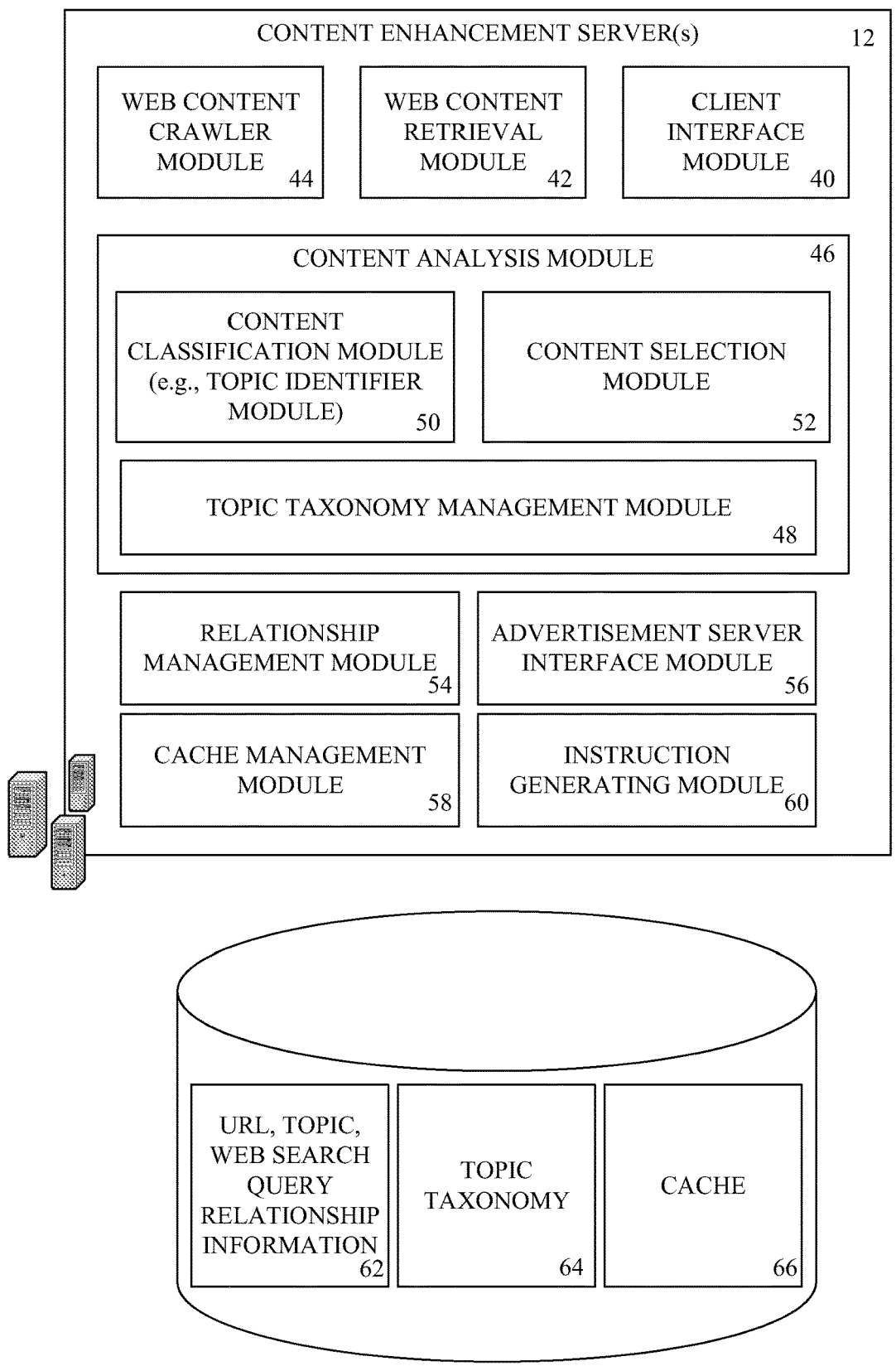
FIG. 6 is a block diagram illustrating the various functional components or modules of a content enhancement server, consistent with some embodiments of the invention.
Figure 7:
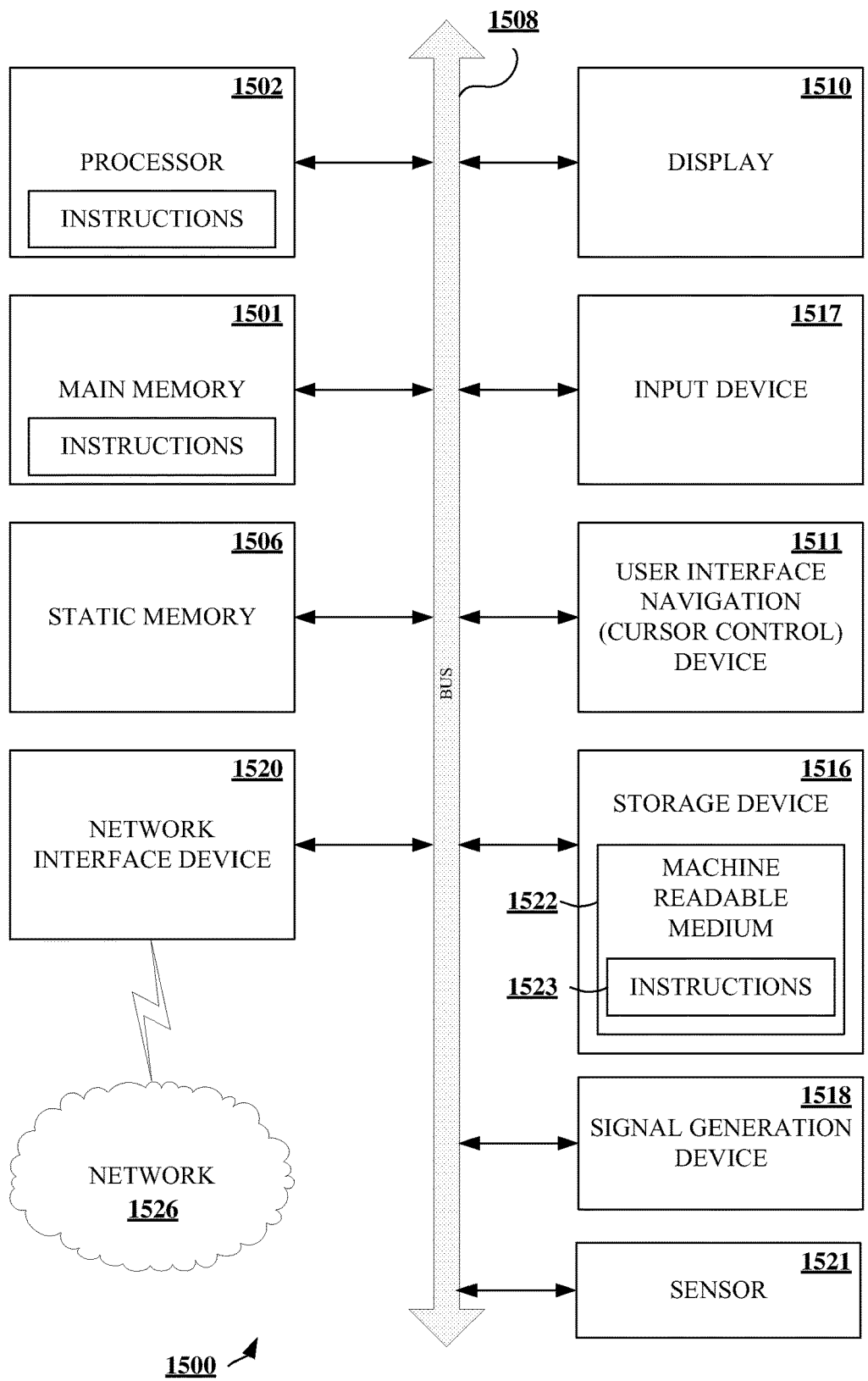
FIG. 7 is a block diagram of a machine in the form of a computing device within which a set of instructions, for causing the machine to perform any one or more of the methodologies discussed herein, may be executed.

FIG. 6 is a block diagram of various functional modules or components of a content enhancements server 12, consistent with some embodiments. As illustrated in FIG. 6, the content enhancement server 12 includes a client interface module 40, a web content retrieval module 42, and a web content crawler module 44. With some embodiments, the client interface module 40 serves as a communications module or mechanism by which the content enhancement server 12 communicates with various client-computing devices. For instance, when a client-computing device sends the content enhancement server 12 a request for enhanced content, the client interface module 40 receives and processes the request accordingly. With some embodiments, the client interface module 40 will communicate requests to the client-computing device, for example, to request that the client-computing device send additional information, such as the text of the web page that is being presented at the client-computing device. With some embodiments, the client interface module 42 sends to the client-computing device web page modification instructions, instructing or directing the content rendering application residing and executing at the client-computing device to modify the content of the web page to present enhanced content.

With some embodiments, when a client-computing device sends an initial request for enhanced content to the content enhancement server 12, the request will indicate the URL of the web page that is being presented at the client-computing device, and for which enhancement is being requested. Accordingly, the web content retrieval module 42 may use the URL received from the client-computing device 42 to request a copy of the web page from the content server that is hosting the web page, as specified in the URL. Accordingly, the received copy of the web page can be analysed by the content analysis module 46 as part of one or more web page enhancement algorithms.

With some embodiments, the web content crawler module 44 systematically requests content (e.g., web pages) from various content servers. For example, with some embodiments, when a content provider partners with the operator of the content enhancement server 12, the content provider may specify a domain or address of a web site with which the content provider desires to use the service of the content enhancement server. Accordingly, the content enhancement server 12 may use this domain or address to periodically "crawl" or discover the content being hosted by the content provider. The web content crawler module 44 operates in conjunction with the content analysis module 46 to identify and analyze web pages and related web content. The analysis can then be used to process requests for enhanced content received from various client-computing devices.

As illustrated in FIG. 6, the content enhancement server 12 includes a content analysis module 46, which is itself comprised of a topic taxonomy management module 48, a content classification module 50, and a content selection module 52. The content classification module receives web-based content, including web pages and/or the text of web pages, and performs various statistical analyses on the content to classify the content, for example, by identifying one or more topics to which the content relates. The results of the analysses are used by the web page enhancement algorithms, for instance, to select the words and/or phrases in a web page to be converted to interactive links, and to select the additional content for presentation with the web page. With some embodiments, the content analysis module 46, given the text of a web page and the text of a web search query, will identify the instances of the web search query in the text of the web page, if any, including the positions and frequency, etc. As the content analysis module 46 analyzes various web pages for the first time, the topic taxonomy management module 48 updates the topic taxonomy to reflect the results of the analysis of the web page, for example, by performing operations to generate new topic clusters, update word counts and so forth. With some embodiments, the content enhancement module 46 includes a content selection module 52 to select the actual content to be presented in connection with the web page. For instance, with some embodiments, one or more advertisement servers may provide advertisement content information to the content enhancement server for a particular web page being presented at the client-computing device. The content selection module 52 will select from the various received advertisements the advertisements to be included in or otherwise associated with the web page modifications instructions, to be sent to the client-computing device.

As illustrated in FIG. 6, the content enhancement server 12 includes a relationship management module 54. In general, the relationship management module 54 identifies and manages the information concerning the relationships between web search queries, web pages or URLs, and topics. For example, when a content enhancement request is received and processed at the content enhancement server 12, and the request includes or is associated with the text of a user's web search query, the relationship management module 54 will update the information in the database that indicates the particular relationship. Similarly, after the content analysis module has identified the topics to which the web page relates, the management module 54 will update the relationship information to indicate how the particular web search query relates to the various topics. Accordingly, this relationship information can be used by the content enhancement server to identify when there exists a high correlation between a particular URL and a particular web search query, such that the web search query with the high correlation can be used as an input to a web page enhancement algorithm.

The cache management module 58 manages a cache 66, which may store a variety of information, including the content of various web pages that have been received and analyzed at the content enhancement server 12. With some embodiments, in addition to storing the raw content (e.g., text and/or source code/document) of a web page, the cache may be used to store the results of some analysis performed on the content, including the identification of one or more topics to which the web page relates, and any web page modification instructions previously generated for the web page. In addition, each cache entry will include one or more timestamps identifying, for example, the time when the web page was received, and/or analysed.

With some embodiments, one or more of the content selection algorithms involve communicating various information to one or more advertisement servers, thereby enabling the advertisement servers to select advertisement content based on the information. Accordingly, with some embodiments, an advertisement server module 56 facilitates communications with one or more advertisement servers.

Finally, the content enhancement server 12 includes an instruction generating module 60. The instruction generating module 60 generates a set of web page modification instructions that are ultimately communicated to a client-computing device to direct the client-computing device to enhance the web page being presented at the client-computing device. With some embodiments, the instructions are a script, such as JavaScript.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules or objects that operate to perform one or more operations or functions. The modules and objects referred to herein may, in some example embodiments, comprise processor-implemented modules and/or objects.

Similarly, the methods described herein may be at least partially processor-implemented. For example, at least some of the operations of a method may be performed by one or more processors or processor-implemented modules. The performance of certain operations may be distributed among the one or more processors, not only residing within a single machine or computer, but deployed across a number of machines or computers. In some example embodiments, the processor or processors may be located in a single location (e.g., within a home environment, an office environment or at a server farm), while in other embodiments the processors may be distributed across a number of locations.

The one or more processors may also operate to support performance of the relevant operations in a "cloud computing" environment or within the context of "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs)).

FIG. 6 is a block diagram of a machine in the form of a computer system within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a client-server network environment, or as a peer machine in peer-to-peer (or distributed) network environment. In a preferred embodiment, the machine will be a server computer, however, in alternative embodiments, the machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a central processing unit (CPU), a graphics processing unit (GPU) or both), a main memory 1501 and a static memory 1506, which communicate with each other via a bus 1508. The computer system 1500 may further include a display unit 1510, an alphanumeric input device 1517 (e.g., a keyboard), and a user interface (UI) navigation device 1511 (e.g., a mouse). In one embodiment, the display, input device and cursor control device are a touch screen display. The computer system 1500 may additionally include a storage device 1516 (e.g., drive unit), a signal generation device 1518 (e.g., a speaker), a network interface device 1520, and one or more sensors 1521, such as a global positioning system sensor, compass, accelerometer, or other sensor.

The drive unit 1516 includes a machine-readable medium 1522 on which is stored one or more sets of instructions and data structures (e.g., software 1523) embodying or utilized by any one or more of the methodologies or functions described herein. The software 1523 may also reside, completely or at least partially, within the main memory 1501 and/or within the processor 1502 during execution thereof by the computer system 1500, the main memory 1501 and the processor 1502 also constituting machine-readable media.

While the machine-readable medium 1522 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 1523 may further be transmitted or received over a communications network 1526 using a transmission medium via the network interface device 1520 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A method comprising:
   receiving, at a server computer, text from a client computing device, the text representing a user's web search query that has been submitted to a search engine during a web browsing session of the user;
   accessing a target web page that the user has requested to view subsequent to the submitting of the user's web search query;
   before communicating the target web page for presentation on the client computing device, selecting a content item in ordinary text of the target web page based on a combination of a first related score, a second related score, and a third related score, the first related score representing a relatedness of the target web page to the content item, the second related score representing a relatedness of the content item to advertising content, the third related score representing a relatedness of the target web page to the advertising content;
   selecting the advertising content based on the selecting of the content item;
   modifying the target web page in real-time to convert the content item in the web page to an interactive link such that when the interactive link is invoked by the client computing device, the client computing device presents the advertising content along with the web page; and
   communicating to the modified target web page to client computing device for presentation on the client computing device.

2. The method of claim 1, wherein a script processed by the client computing device causes the client computing device to extract the text from a URL of the target web page.

3. The method of claim 1, wherein the accessing of the target web page includes retrieving the target web page includes retrieving the target web page from a cache accessible to the module of the server computer.

4. The method of claim 1, wherein the text is included in a Uniform Resource Locator (URL) of the target web page that is received from the client computer device.

5. The method of claim 1, wherein the text is derived from a URL that includes a unique identifier of the target web page and the text.

6. The method of claim 1, wherein the selecting of the content item is based on the content item matching the text exactly.

7. The method of claim 1, wherein the invoking includes any one of:
   a selection event involving a selection of the interactive link by a user activating a user control associated with a cursor control device after manipulating the cursor control device to position a cursor over the link;
   a selection event involving a selection of the interactive link by a user touching a location on a touch screen display where the link is displayed; and,
   a mouse over event involving a user manipulating a cursor control device to position a cursor near, or over, the interactive link.

8. The method of claim 1, wherein said selecting of the advertising content comprises:
   determining that the text is present in a list of words and/or phrases maintained at the server;
   responsive to the determination, communicating the text to an advertisement server; and
   receiving the advertising content information from the advertisement server, the advertising content information selected by the advertisement server based on the text.

9. The method of claim 1, wherein the server maintains a taxonomy of topics for use in determining topics to which a web page relates, each topic in the taxonomy being associated with one or more words and/or phrases, and said selecting of the advertising content comprises:
   analyzing the text of the web page to identify in the taxonomy of topics one or more topics to which the web page relates;
   determining that the text matches, exactly or partially, a word or phrase associated with an identified topic to which the web page relates; and
   responsive to the determination, communicating the text to an advertisement server; and
   receiving the advertising content from at least one advertisement server, the advertising content selected by the advertisement server based on the text.

10. The method of claim 1, wherein the server maintains a taxonomy of topics for use in determining topics to which a web page relates, each topic in the taxonomy being associated with one or more words and/or phrases, and said selecting of the advertising content comprises:
- analyzing the text of the web page to identify in the taxonomy of topics one or more topics to which the web page relates;
- communicating the text and at least one topic to an advertisement server; and
- receiving the advertising content from at least one advertisement server, the advertising content selected by the advertisement server based on the text and/or the at least one topic.

11. The method of claim 1, wherein the server maintains a taxonomy of topics for use in determining topics to which a web page relates, and said selecting of the advertising content comprises:
- analyzing the text of the web page to identify in the taxonomy of topics one or more topics to which the web page relates;
- analyzing the text of the web page to identifying one or more words and/or phrases present in the web page, the words and/or phrases associated with the one or more identified topics;
- communicating the text of the user's web search query, at least one topic, and at least one keyword to an advertisement server; and
- receiving the advertising content from the advertisement server, the advertising content selected by the advertisement server based on the text, the at least one topic, and the at least one keyword.

12. The method of claim 1, wherein the score is an overall related score that further represents a relatedness of the target web page to the advertising content.

13. The method of claim 12, wherein the overall related score includes a normalization of weightings of each of the relatedness of the content item to the target web page, the relatedness of the content item to the advertising content, the relatedness of the target web page to the advertising content.

14. The method of claim 13, wherein the overall related score is one of a number of highest related scores of content items including in the target web page, the number determined by an administrator.

15. The method of claim 1, wherein the relatedness of the content item to the target web page is based on a click-through rate of the content item and the relatedness of the content item to the advertising content is based on an expected value of associating the advertising content with the interactive hyperlink.

16. A system including one or more processors and at least one machine readable storage medium storing instructions, which, when executed by a processor of the one or more processors, cause the system to perform operations comprising:
- receiving text from a client computing device, the text representing a user's web search query that has been submitted to a search engine during a web browsing session of the user;
- accessing a target web page that the user has requested to view subsequent to the submitting of the user's web search query;
- before communicating the target web page for presentation on the client computing device, selecting a content item in ordinary text of the target web page based on a combination of a first related score, a second related score, and a third related score, the first related score representing a relatedness of the target web page to the content item, the second related score representing a relatedness of the content item to advertising content, the third related score representing a relatedness of the target web page to the advertising content;
- selecting the advertising content based on the selecting of the content item; and
- modifying the target web page in real-time to convert the content item in the web page to an interactive link such that when the interactive link is invoked by the client computing device the client computing presents the selected advertising content.

17. The system of claim 16, wherein a script processed by the client computing device causes the client computing device to extract the text from a URL of the target web page.

18. The system of claim 16, wherein the accessing of the target web page includes retrieving the target web page from a cache accessible to the system.

19. The system of claim 16, wherein the text is included in a Uniform Resource Locator (URL) of the target web page that is received from the client computer device.

20. The system of claim 16, wherein the text is derived from a URL that includes a unique identifier and the text.

21. The system of claim 16, wherein the selectin of the content item is based on the content item matching the text exactly.

22. The system of claim 16, wherein the invoking includes any one of:
- a selection event involving a selection of the interactive link by a user activating a user control associated with a cursor control device after manipulating the cursor control device to position a cursor over the link;
- a selection event involving a selection of the interactive link by a user touching a location on a touch screen display where the link is displayed; and
- a mouse over event involving a user manipulating a cursor control device to position a cursor near, or over, the interactive link.

23. The system of claim 16, wherein said selecting of the advertising content comprises:
- determining that the text is present in a list of words and/or phrases maintained at the server;
- responsive to the determination, communicating the text to an advertisement server; and
- receiving the advertising content information from the advertisement server, the advertising content information selected by the advertisement server based on the text.

24. The system of claim 16, wherein the system maintains a taxonomy of topics for use in determining topics to which a web page relates, each topic in the taxonomy being associated with one or more words and/or phrases, and said selecting of the advertising content comprises:
- analyzing the text of the web page to identify in the taxonomy of topics one or more topics to which the web page relates;
- determining that the text matches, exactly or partially, a word or phrase associated with an identified topic to which the web page relates; and
- responsive to the determination, communicating the text to an advertisement server; and
- receiving the advertising content from at least one advertisement server, the advertising content selected by the advertisement server based on the text.

25. The system of claim 16, wherein the system maintains a taxonomy of topics for use in determining topics to which a web page relates, each topic in the taxonomy being associated with one or more words and/or phrases, and said selecting of the advertising content comprises:

analyzing the text of the web page to identify in the taxonomy of topics one or more topics to which the web page relates;

communicating the text and at least one topic to an advertisement server; and receiving the advertising content from at least one advertisement server, the advertising content selected by the advertisement server based on the text and/or the at least one topic.

26. The system of claim 16, wherein the system maintains a taxonomy of topics for use in determining topics to which a web page relates, and said selecting of the advertising content comprises:

analyzing the text of the web page to identify in the taxonomy of topics one or more topics to which the web page relates;

analyzing the text of the web page to identifying one or more words and/or phrases present in the web page, the words and/or phrases associated with the one or more identified topics;

communicating the text of the user's web search query, at least one topic, and at least one keyword to an advertisement server; and receiving the advertising content from the advertisement server, the advertising content selected by the advertisement server based on the text, the at least one topic, and the at least one keyword.

\* \* \* \* \*

UNITED STATES PATENT AND TRADEMARK OFFICE
CERTIFICATE OF CORRECTION

PATENT NO. : 10,719,836 B2  
APPLICATION NO. : 13/234679  
DATED : July 21, 2020  
INVENTOR(S) : Henkin et al.

Page 1 of 1

It is certified that error appears in the above-identified patent and that said Letters Patent is hereby corrected as shown below:

On the Title Page

In item (54), in "Title", in Column 1, Line 3, after "QUERY", insert --¶(71) Applicant: Amobee, Inc., San Diego, CA (US)--

In the Claims

In Column 26, Line 24, in Claim 21, delete "selectin" and insert --selection-- therefor Signed and Sealed this  
Twenty-eighth Day of December, 2021

Drew Hirshfeld  
*Performing the Functions and Duties of the*  
*Under Secretary of Commerce for Intellectual Property and*  
*Director of the United States Patent and Trademark Office*